(12) United States Patent
Taniguchi et al.

(10) Patent No.: US 7,661,187 B2
(45) Date of Patent: Feb. 16, 2010

(54) MANUFACTURING METHOD FOR MAGNETIC DISK DRIVE

(75) Inventors: Masato Taniguchi, Kanagawa (JP); Michio Nakajima, Kanagawa (JP); Kaoru Umemura, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 497 days.

(21) Appl. No.: 11/295,206

(22) Filed: Dec. 5, 2005

(65) Prior Publication Data
US 2006/0126204 A1 Jun. 15, 2006

(30) Foreign Application Priority Data
Dec. 15, 2004 (JP) .............................. 2004-362809

(51) Int. Cl.
*G11B 5/127* (2006.01)
*H04R 31/00* (2006.01)

(52) U.S. Cl. .............. 29/603.03; 29/603.04; 29/603.06; 29/603.07; 360/31; 360/53; 714/44

(58) Field of Classification Search ................ 29/593, 29/603.03, 603.04, 603.06, 603.09; 360/31; 360/53; 714/44
See application file for complete search history.

(56) References Cited

U.S. PATENT DOCUMENTS

| | | | |
|---|---|---|---|
| 5,623,665 A * | 4/1997 | Shimada et al. ................ 714/5 |
| 6,043,945 A * | 3/2000 | Tsuboi et al. ................. 360/53 |
| 6,088,176 A | 7/2000 | Smith et al. |
| 6,141,168 A | 10/2000 | Takahashi et al. |
| 6,205,099 B1 | 3/2001 | Sasaki et al. |
| 6,552,535 B2 | 4/2003 | Funaki et al. |
| 6,915,446 B2 * | 7/2005 | Riley .............................. 714/5 |
| 2002/0023248 A1 | 2/2002 | Suzuki et al. |

FOREIGN PATENT DOCUMENTS

| | | | |
|---|---|---|---|
| JP | 64-44453 | | 3/1989 |
| JP | 01073665 A | * | 3/1989 |
| JP | 01-205704 A | | 8/1989 |
| JP | 07-085409 A | | 3/1995 |
| JP | 09-237447 A | | 9/1997 |
| JP | 2004-005850 | | 1/2004 |

* cited by examiner

*Primary Examiner*—Paul D Kim
(74) *Attorney, Agent, or Firm*—Townsend and Townsend and Crew LLP; Patrick Duncan (57) ABSTRACT

The present invention relates to providing the manufacturing method for a magnetic disk drive that includes the process steps of detecting and processing in a simplified way the defective sectors causing a reading error at low operating environmental temperatures. In one example, defective sectors are detected by read/write testing at high operating environmental temperatures from, for example, 40° C. to 65° C. Reading the data written on the defective sectors makes it obvious that the gain in a high-frequency band is reduced. After test data has been written onto each sector, the filtering coefficient of an FIR element that is set for a data-reading system is changed from the optimum value. The frequency gain is thus reduced. Next, the test data is read and the sectors that have caused a reading error are registered as defectives.

16 Claims, 7 Drawing Sheets

MANUFACTURING METHOD FOR MAGNETIC DISK DRIVE

CROSS-REFERENCES TO RELATED APPLICATIONS

This application claims priority from Japanese Patent Application No. JP2004-362809, filed Dec. 15, 2004, the entire disclosure of which is incorporated herein by reference.

BACKGROUND OF THE INVENTION

The present invention relates to a technique for processing defects in the sectors of a magnetic disk, and more particularly, to a sector defect processing technique suitable for ensuring the reliability of a magnetic disk drive which operates at low temperature.

Magnetic disks for use in magnetic disk drives are each manufactured by stacking magnetic layers on a substrate using a thin-film forming technique such as sputtering. Even a slight depression or projection on the surface of the glass substrate itself, changes in conditions during the sputtering process, or imperfect surface treatment may cause the magnetic layer surface defects that the magnetic disk, as a recording medium, does not perform its intended function properly.

The surface defects here focus attention on sector-by-sector data reading/writing reliability and do not refer only to defects serious enough to immediately cause any trouble relating to data reading from/writing into the magnetic disk drive. They also include such latent defects that cause a reading error to easily occur in comparison with other almost sectors if various conditions overlap. An error correction code (ECC) for detecting and correcting any disparities in bit strings between the data written on the magnetic disk and the data read out therefrom, is provided in the magnetic disk drive. For practical use, therefore, there is no problem if the number of bits in which a reversal error is occurring due to very small defects on the magnetic disk is within the error correction capability of ECC.

If any sectors with a latent defect are left intact, however, an increase in physical defect size is likely to increase the number of reversal bits too significantly to be correctible with ECC. Exposure of the magnetic disk to a high-temperature environment for an extended time, in particular, accelerates the expansion of the defect. At the manufacturing stage of magnetic disk drives, therefore, before the disk drives are shipped, the appropriate measure must be taken so that even a minute defect is detected with high sensitivity to prevent the defective section from being used. Among the methods of detecting defective sectors on a magnetic disk is a read/write testing method in which test data is written onto the mounted magnetic disk of the magnetic disk drive and then read out therefrom to confirm whether the written data can be read out properly.

With the increased use of magnetic disk drives for diverse purposes in recent years, opportunities for magnetic disk drive usage at low operating ambient temperatures near 0° C. are increasing. For example, HDD recorders are operated in automatic recording mode late in the night of a low room temperature or the images that were acquired using video cameras are recorded outdoors. At lower operating environmental temperatures, magnetic disk drives tend to decrease in data-reading performance since thermal shrinkage of each of the respective heads increases the interval between the magnetic disk surface and the head. During read/write tests, therefore, even a defective sector not causing the defect to emerge until the disk drive has been placed in first use at a low operating environmental temperature requires pre-shipping detection and appropriate correction.

Patent Document 1 (Japanese Patent Laid-open No. 2004-5850) discloses a technique for detecting defects in the recording medium of a magnetic disk drive very accurately and with ease. The invention described in this document uses a Viterbi decoder to process the data read out from the sectors on the recording medium, compares the data with reference data, and detects Viterbi errors. After this, the invention examines each sector and judges the presence or absence of defects from the length of the data that is causing the succession of Viterbi errors. Patent Document 2 (U.S. Pat. No. 6,088,176) discloses a technique in which the signals that have been read from a magnetic disk by using FIR are first separated into magnetic signals and thermal signals and then the thermal signals are used for defect detection of the disk.

BRIEF SUMMARY OF THE INVENTION

Figure 1:
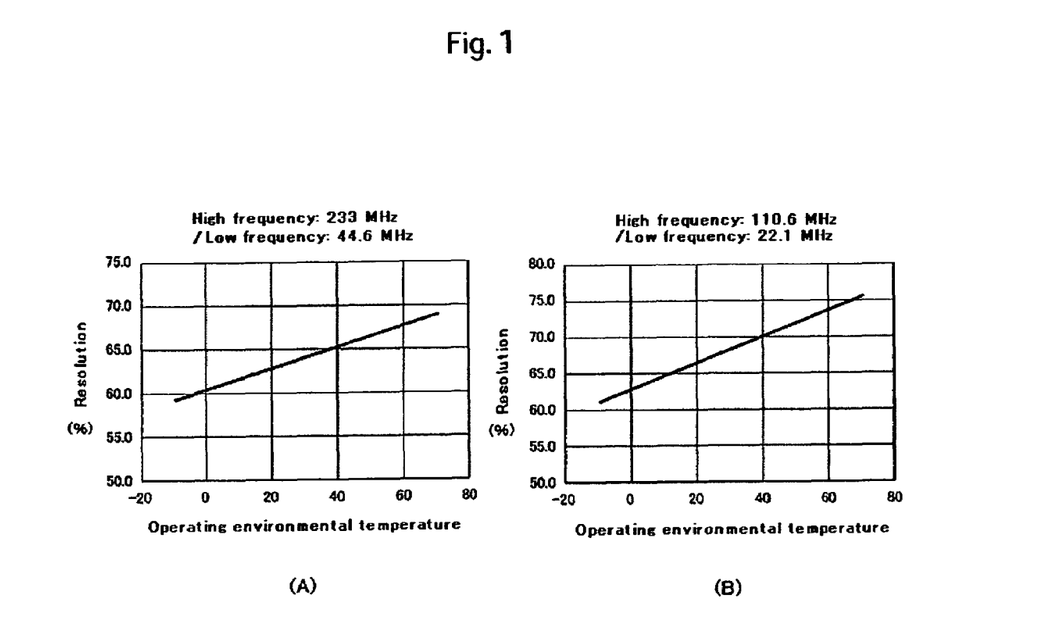
FIG. 1 illustrates the frequency characteristics of a reading signal with respect to the operating environmental temperature of a magnetic disk drive.

When a magnetic disk drive is operated at low operating environmental temperatures such as 0° C. to 5° C., the disk drive does not tend only to suffer a decrease in data reading capability due to an increase in the interval between the magnetic disk of the disk drive and a head thereof. The disk drive also tends to suffer a further decrease in data reading capability due to the frequency characteristics of a data-reading system. At low operating environmental temperatures, the gain of the data-reading system in the low-frequency band included in data-reading signals does not change too greatly. However, the gain in the high-frequency band included in the data-reading signals decreases. FIG. 1 illustrates the frequency characteristics of the data-reading signals of a magnetic disk drive with respect to changes in operating environmental temperature. Both FIGS. 1(A) and 1(B) indicate a state in which the characteristic of the resolution (%) obtained by dividing the high-frequency voltage components included in the output voltage of the head amplifier connected to a magnetic read head, by the low-frequency voltage components included in the output voltage, varies with the operating environmental temperature.

FIG. 1(A) is a graph of the resolution calculated with respect to the high-frequency (223 MHz) voltage components and low-frequency (44.6 MHz) voltage components included in the head amplifier output voltage that was measured in the high-circumferential-velocity region of a magnetic disk on its outer circumferential track side. FIG. 1(B) is a graph of the resolution calculated with respect to the high-frequency (110.6 MHz) voltage components and low-frequency (22.1 MHz) voltage components included in the head amplifier output voltage that was measured in the low-circumferential-velocity region of the magnetic disk on its inner circumferential track side. Both graphs indicate that the resolution lowers with decreases in operating environmental temperature, that as the operating environmental temperature lowers, the gain in the high-frequency band decreases, and thus that the magnetic disk decreases in data-reading capability.

Also, through the analysis of the relationship between the resolution and sectors, a tendency for the gain of the data-reading system in the corresponding magnetic disk drive to decrease in the high-frequency band with the decreases in the operating environmental temperature is already proven to remarkably appear at defective sectors. This, in turn, indicates that although data reading at high operating environmental temperatures does not easily result in reading errors, there is a strong tendency for reading at low operating environmental temperatures to result in reading errors.

Prior to product shipping, a defective sector not causing the defect to emerge until the magnetic disk drive has been placed into first use at such a low operating environmental temperature may be detected. In this case, read/write testing under a low-temperature operating environment is required. In addition, hence, vast equipment investments for improved testing environment such as low-temperature chamber. Also, read/write tests may be conducted under a normal-temperature or high-temperature operating environment with a further reduced number of ECC symbols or with a reduced soft-error rate (SER) threshold value for improved defect detection sensitivity. In this case, nondefective sectors not causing a reading error even in a low-temperature operating environment are also liable to be identified as defective sectors. If this actually happens, the resulting decrease in the capacity of the magnetic disk or increase in inspection time will also adversely affect the manufacturing yield of magnetic disk drives of the corresponding type.

Accordingly, a feature of the present invention is to provide the manufacturing method for a magnetic disk drive that includes the process of processing magnetic disk defective sectors with high accuracy. Another feature of the present invention is to provide the manufacturing method for a magnetic disk drive that includes a sector defect processing process suitable for ensuring the reliability of the magnetic disk drive. Yet another feature of the present invention is to provide the manufacturing method for a magnetic disk drive that includes a simplified process in which the defective sectors causing a reading error when the magnetic disk drive is operated in a low-temperature operating environment are processed at normal temperature or high temperature.

The principles of the present invention exist in that in a read/write-test-based method of processing defects present in the sectors of a magnetic disk, the invention improves defect detection sensitivity by reducing the gain of the data-reading system of the corresponding magnetic disk drive in a high-frequency band to a level lower than the gain obtained in normal operation mode. When data that was written into defective sectors is read, the rate of the gain in the high-frequency band to the gain in the low-frequency band lowers with decreases in the operating environmental temperature of the magnetic disk drive. Therefore, in order to ensure, during read/write tests, prior detection of the sectors causing a reading error as a result of a defect emerging at a low operating environmental temperature, the data-reading system is set to have frequency characteristics similar to those obtained at the low operating environmental temperature.

A first aspect of the present invention provides a manufacturing method for a magnetic disk drive which includes a magnetic disk on which a plurality of sectors are defined, and a data-reading system employing a partial response method, and which processes defects in the sectors, the manufacturing method comprising the steps of: writing test data onto the plurality of sectors; reducing a gain of the data-reading system in a high-frequency band to a value smaller than a value to be used in normal operation mode; and reading, via the data-reading system, the test data from the sectors onto which the data was written, and detecting a reading error.

The data-reading system includes a magnetic read head, a head amplifier, and an R/W channel. The gain of the data-reading system is adjusted to obtain an optimal value in normal operation mode so that the magnetic disk drive develops maximum performance at a user site. Reducing the gain of the data-reading system in a high-frequency band to a value lower than the value used in normal operation mode makes it possible to obtain in the data-reading system a reading signal close to that generated by the magnetic disk drive when it operates at a low operating environmental temperature. Reading test data in this state allows detection and processing of such a defective sector as causing a reading error when the user operates the magnetic disk drive at a low operating environmental temperature.

When a decrement of the gain is set according to the operating environmental temperature used when defects are processed, frequency characteristics close to those achievable at a desired operating environmental temperature can be generated in the data-reading system. More specifically, the decrement of the gain is increased as the operating environmental temperature used for defect processing increases. In the present invention, since reading conditions at a low operating environmental temperature are generated in a simulated fashion by modifying parameter settings of the data-reading system, defects can be processed in the high-temperature (40-65° C.) chamber used for a normal inspection process, and no additional equipment investments are required. The defective sectors that cause reading errors at high operating environmental temperatures can also be detected by using a method of reducing the number of ECC symbols.

If constituent elements of the data-reading system include the FIR filter that uses a partial response (PR) method to equalize waveforms, gain adjustment in a high-frequency band is easily realizable by adjusting a filtering coefficient of the filter. The filtering coefficients of the filter that adapt to the PR method are set to optimized values for each magnetic head. Values of the filtering coefficients are each programmably modified to the optimum value according to a particular operating state of the magnetic disk drive. Using modification coefficients to adopt a configuration for modification of optimal filtering coefficients makes it possible, just by performing program operations, to adjust a gain of the FIR filter in a high-frequency band to a value suitable for defect processing.

When providing a low-pass filter in the data-reading system, it is likewise possible to reduce the gain in a high-frequency band by adjusting a cutoff frequency of the low-pass filter. Conducting each defect-processing step by making an MPU of the intended magnetic disk drive execute a defect-processing program, instead of using a special test apparatus, makes it possible to suppress equipment investments on such a testing apparatus and thus to realize a defect-processing method suitable for mass production.

A second aspect of the present invention provides a manufacturing method for a magnetic disk drive which includes: a magnetic disk on which a plurality sectors are defined; a read head for reading data from the sectors; an automatic gain controller for controlling a magnitude of an analog reading signal to stay within a desired range after the signal has been read by the read head; a low-pass filter for waveform-shaping the analog reading signal after being controlled; an A-D converter for converting into a digital reading signal the analog reading signal after being waveform-shaped; a digital filter for waveform-shaping the digital reading signal; and a microprocessor unit; and which processes defects in the sectors. The manufacturing method comprises the steps of: reducing a gain of the digital filter to a value smaller than a value to be used in a normal operation mode; and judging whether a reading error occurs at each of the plurality of sectors by performing read/write tests on the sectors.

The present invention makes it possible to provide the manufacturing method for a magnetic disk drive that includes the process of processing magnetic disk defective sectors with high accuracy. The present invention also makes it possible to provide the manufacturing method for a magnetic disk drive that includes a sector defect processing process suitable for ensuring the reliability of the magnetic disk drive.

In addition, the present invention makes it possible to provide the manufacturing method for a magnetic disk drive that includes a simplified process in which the defective sectors causing a reading error when the magnetic disk drive is operated in a low-temperature operating environment are processed at normal temperature or high temperatures.

DETAILED DESCRIPTION OF THE INVENTION

Configuration of a Magnetic Disk Drive

Figure 2:
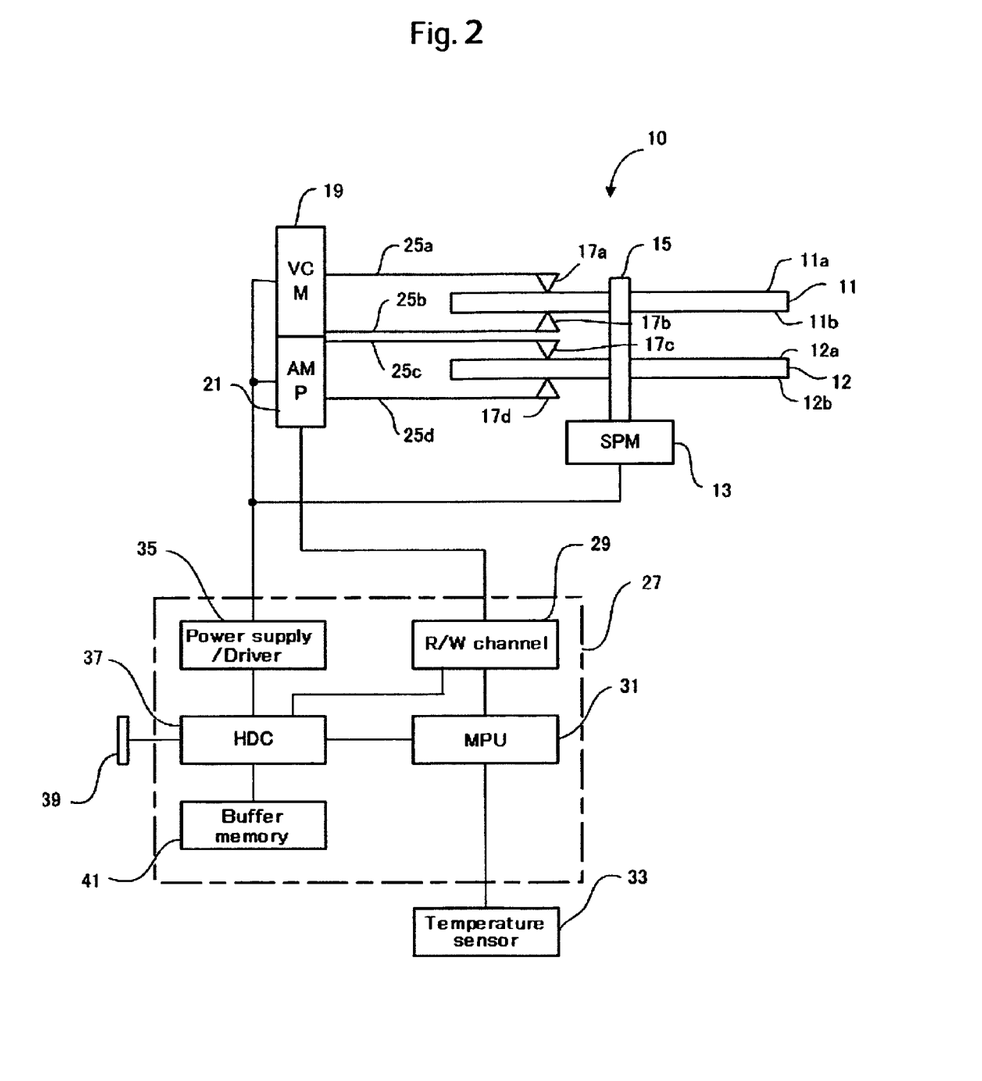
FIG. 2 is a schematic block diagram of the magnetic disk drive according to an embodiment.

FIG. 2 is a schematic block diagram of a magnetic disk drive that processes defects in sectors by using a method according to an embodiment of the present invention. A magnetic disk drive 10 has two magnetic disks 11 and 12. The magnetic disk 11 has recording faces 11a and 11b, and the magnetic disk 12 has recording faces 12a and 12b. A magnetic layer for magnetic recording is formed on each recording face. Also, a protective layer is formed on top of the recording face. In addition, on each recording face, a plurality of data sectors are defined as a minimum unit of data recording, and servo data for magnetic head position control is recorded. Throughout this specification, the data sectors are hereunder referred to simply as sectors. The magnetic disks 11, 12 are fixed to a spindle 15 at desired spatial intervals, and both disks rotate together via a spindle motor (SPM) 13.

The magnetic disk drive 10 has four magnetic heads, 17a, 17b, 17c, 17d, associated with the recording faces 11a, 11b, 12a, 12b, respectively. Each of the magnetic heads is formed on a specific slider, as a dual head that functions as an inductive read head and a GMR write head. In the present invention, however, an inductive magnetic head that operates for both reading and writing can be adopted instead of the above dual head. During operation, either one of the four magnetic heads is selected to be active for accessing a sector of the address specified from a host computer.

The sliders with which the magnetic heads 17a, 17b, 17c, 17d are formed are installed at head support mechanisms 25a, 25b, 25c, 25d, respectively. Each head support mechanism includes a suspension, a carriage, and a voice coil motor (VCM) 19, and positions each magnetic head at a desired track present on the recording face of the associated magnetic disk. A combination of the head support mechanism and the head/slider is referred to as a head stack assembly (HSA).

A head amplifier 21 is installed at an end of the head support mechanism. The head amplifier 21 includes a read/write driver and a read/write selector circuit. The magnetic disk drive 10 further has a circuit board 27 on which are mounted a read/write channel (R/W channel) 29, an MPU 31, a power supply/driver 35, a hard-disk controller (HDC) 37, and a buffer memory 41. The R/W channel 29 employing a PRML (Partial Response Maximum Likelihood) signal-processing scheme, a combination of a PR method and a maximum likelihood decoding method (hereinafter, referred to simply as the ML method), includes a data-reading system and a data-writing system. The data-reading system includes a variable gain amplifier (VGA), a waveform equalizer, an A/D converter, an FIR (Finite Impulse Response) filter, a Viterbi decoder, a modulator, and a serial-parallel signal converter. The data-writing system includes a scrambler, a modulator, a serial-to-parallel converter, an NRZ-NRZI converter, and a recording compensator.

The MPU 31 includes a microprocessor unit (MPU), a ROM, a defect-processing program, an EEPROM, and a RAM. The MPU controls total operation of the magnetic disk drive 10. The ROM stores, in addition to the firmware that controls basic operation of the magnetic disk drive, a defect-processing program that conducts defect-processing steps according to the embodiment of the present invention. The EEPROM stores various parameters. The RAM is used as a program execution or work region.

The firmware includes a firmware component intended for operation in the inspection mode, and another firmware component intended for operation in the normal operation mode. When operating in the inspection mode, the MPU 31 executes the defect-processing program, and when operating in the normal operation mode, the MPU controls the magnetic disk drive 10 to supply services to a user. Switching between the inspection mode and normal operation mode is accomplished by selecting the firmware that is to be started up under a command issued from an external apparatus, or in accordance with judgment of jumper block settings by the MPU 31.

A temperature sensor 33 for measuring an internal temperature of the magnetic disk drive is connected to the MPU 31. A modification table in which the modification coefficients that adjust filtering coefficients of the FIR filter in order to process defects have been arranged to accommodate changes in operating environmental temperature is stored within the EEPROM. During defect-processing program execution in the inspection mode, the modification coefficients are used to modify the filtering coefficient values of the FIR filter 57 that have been optimized for the magnetic disk drive 10 operating in the normal operation mode. The modification reduces a gain of the FIR filter in a high-frequency band, thus improving detectability of defective sectors prone to cause reading errors to emerge at low operating environmental temperatures.

The modification coefficients are constructed to increase a decrement of the gain as the magnetic disk drive 10 undergoing defect processing increases in operating environmental temperature. That is to say, the modification coefficients are set to achieve greater decrements of the FIR filter gain at higher operating environmental temperatures. Thus, a state in which a gain of the data-reading system in a high-frequency band with respect to the data recorded on defective sectors lowers with decreases in the operating environmental temperature of the magnetic disk drive 10 will be generated in a simulated form at various operating environmental temperatures during defect processing. The modification coefficients are set so that in a 40° C.-65° C. operating environmental temperature range for normal read/write tests, for example, if 40° C., 50° C., or 65° C. is set as the operating environmental temperature, the decrement of the gain is maximized at 65° C. and minimized at 40° C.

The HDC 37 includes a servo controller, a buffer controller that controls the buffer memory 41, and an ECC circuit. The servo controller uses servo data to control seek operation and track-following operation. The ECC circuit generates ECC bits to be added to the data bits sent from the host computer or corrects the user data read from the magnetic disk. If the user data cannot be properly read even by using ECC, the HDC 37 clearly asserts that this state is a reading error. The buffer memory 41 is used to implement high-speed data transfer between the host computer and the magnetic disk drive. The power supply/driver 35 includes an SPM driver for supplying an operating current to the SPM 13, a VCM driver for supplying an operating current to the VCM 19, a DA converter, and a power supply circuit. An interface connector 39 for data communication with the host computer is mounted on the circuit board 27.

Configuration of the Data-Reading System

Figure 3:
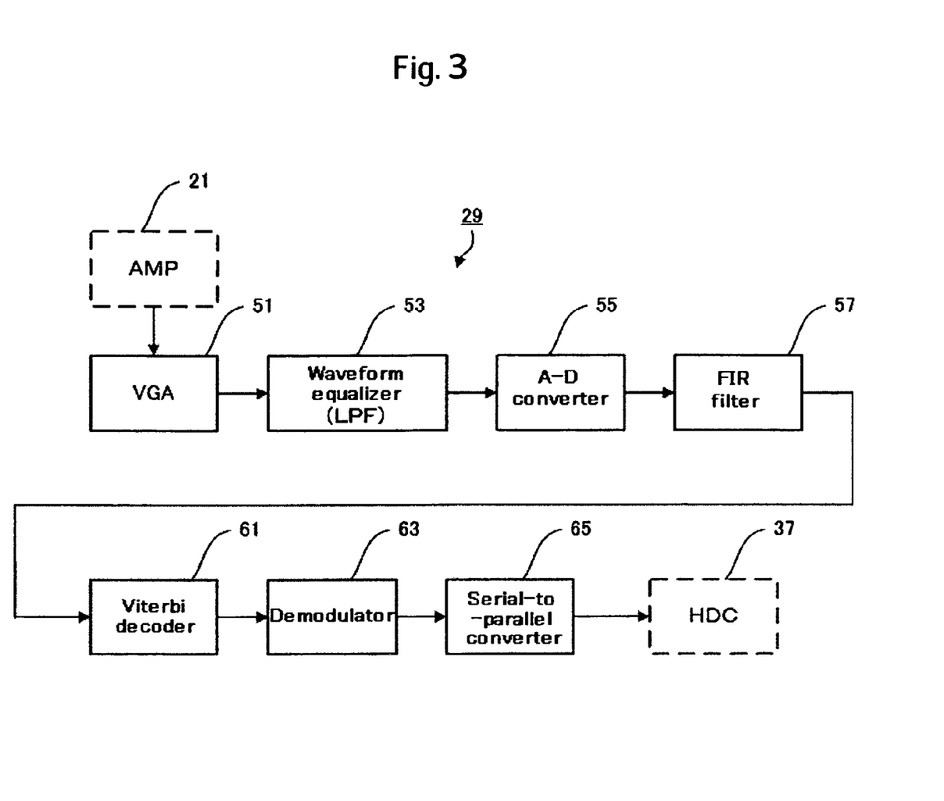
FIG. 3 is a schematic block diagram of the data-reading system used in the magnetic disk drive according to the embodiment.

FIG. 3 is a block diagram of the data-reading system constituting the R/W channel 29. The data-reading system, in a broad sense, includes not only the R/W channel, but also the read head, the head amplifier 21, and the HDC 37. An analog reading signal that has been amplified by the head amplifier 21 enters the VGA 51. The VGA 51 is constituted by an automatic gain controller (AGC), and is controlled so that an output voltage of the reading signal may stay within a fixed range. An output of the VGA 51 enters a waveform equalizer 53. The waveform equalizer 53 is a low-pass filter (LPF) having constant group delay characteristics. The waveform equalizer is also referred to as a continuous time filter (CTF), a gain of which can be programmably changed by controlling a cutoff frequency. The LPF 53 not only reduces the noise included in the reading signal, but also shapes a waveform thereof to implement waveform equalizing into a required PR class.

Waveform equalizing refers to shaping the waveform of the reading signal to obtain a value close to any of the values allowed for PR classes under which voltage levels of the reading signal at sampling points thereof are assumed as the waveforms read by the magnetic head. For example, the values allowed are, for PR4, 0, 1, for EPR4 (Extended PR4), 0, 1, 2, and for EEPR4 (Enhanced Extended PR4), 0, 1, 2, 3. After receiving the analog reading signal from the waveform equalizer 53, an A-D converter 55 quantizes the reading signal and converts the signal into a digital signal. The FIR filter 57 is a digital filter by which the waveform of the reading signal that has been equalized by the waveform equalizer 53 is re-equalized to have frequency characteristics close to those of a desired PR class. An equalizing quantity of the FIR filter can be programmably changed by adjusting a filtering coefficient.

Figure 4:
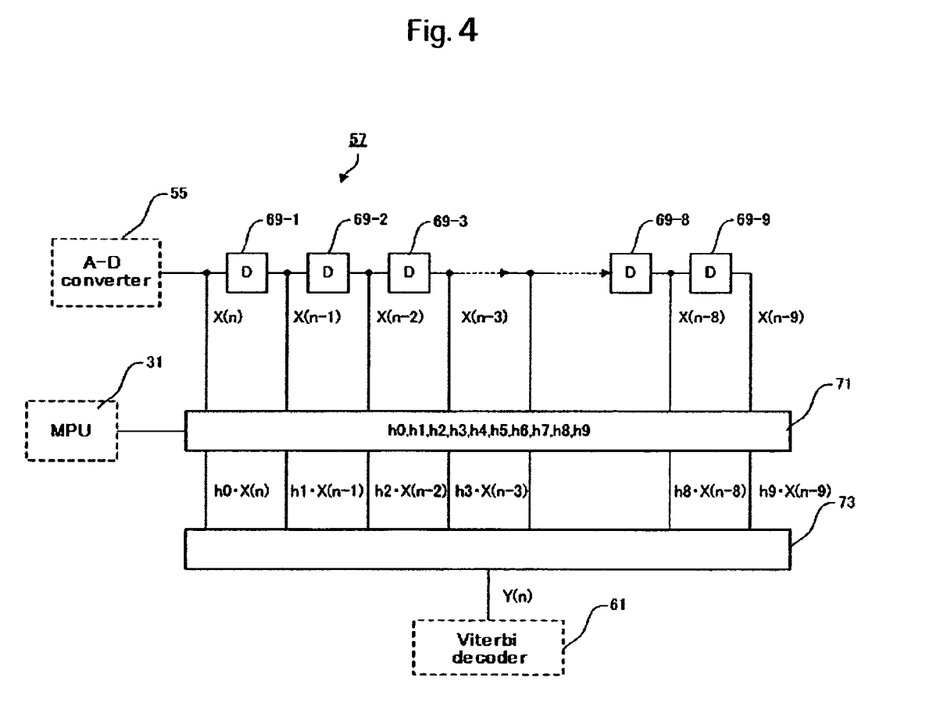
FIG. 4 is a block diagram showing an example of an FIR filter configuration according to the embodiment.

A configuration example of the FIR filter 57 is shown in FIG. 4. Inside the FIR filter 57, nine delay circuits 69-1 to 69-9 are connected in series and ten taps are taken out from inputs/outputs of each delay circuit and connected to a filtering coefficient multiplier 71. Ten outputs from the filtering coefficient multiplier 71 are further connected to an adder 73. The delay circuits 69-1 to 69-9 each output a specific input pulse with one clock of delay and can take a shift register arrangement. The MPU 31 is connected to the filtering coefficient multiplier 71, and the filtering coefficients h0 to h9 are set or modified by the filtering coefficient multiplier 71. The filtering coefficient multiplier 71 is controlled by the MPU 31 such that when the magnetic disk drive operates in normal operation mode, an optimal filtering coefficient value is set according to a particular operating state of the magnetic disk drive. Optimal filtering coefficient values are defined in accordance with the particular operating environmental temperature and other parameters relating to the magnetic heads and track zones, and are stored within the EEPROM or the like. The adder 73, after receiving nine inputs from the filtering coefficient multiplier 71, adds the inputs and then outputs addition results to a Viterbi decoder 61.

Operational description of the FIR filter 57 in normal operation mode is given below. When pulse X(n) of the input digital reading signal from the A-D converter 55 enters the delay circuit 69-1, pulses X(n−1) to X(n−9) delayed by one clock of timing in the delay circuits 69-1 to 69-9, respectively, are generated and then output from each tap to the filtering coefficient multiplier 71. The filtering coefficient values h0 to h9 that were selected as the optimal values for the normal operation mode are stored within the filtering coefficient multiplier 71. The filtering coefficient multiplier 71 performs multiplications between a filtering coefficient value and the input value from the tap of each delay circuit by relating these values as in "h0·X(n), h1·X(n−1), h2·X(n−2), etc. up to h9·X(n−9)". When each output of the filtering coefficient multiplier 71 is added by the adder 73, output Yn of the adder 73 is given as follows:

$$Yn = h0 \cdot X(n) + h1 \cdot X(n-1) + h2 \cdot X(n-2) \ldots h9 \cdot X(n-9)$$

Figure 5:
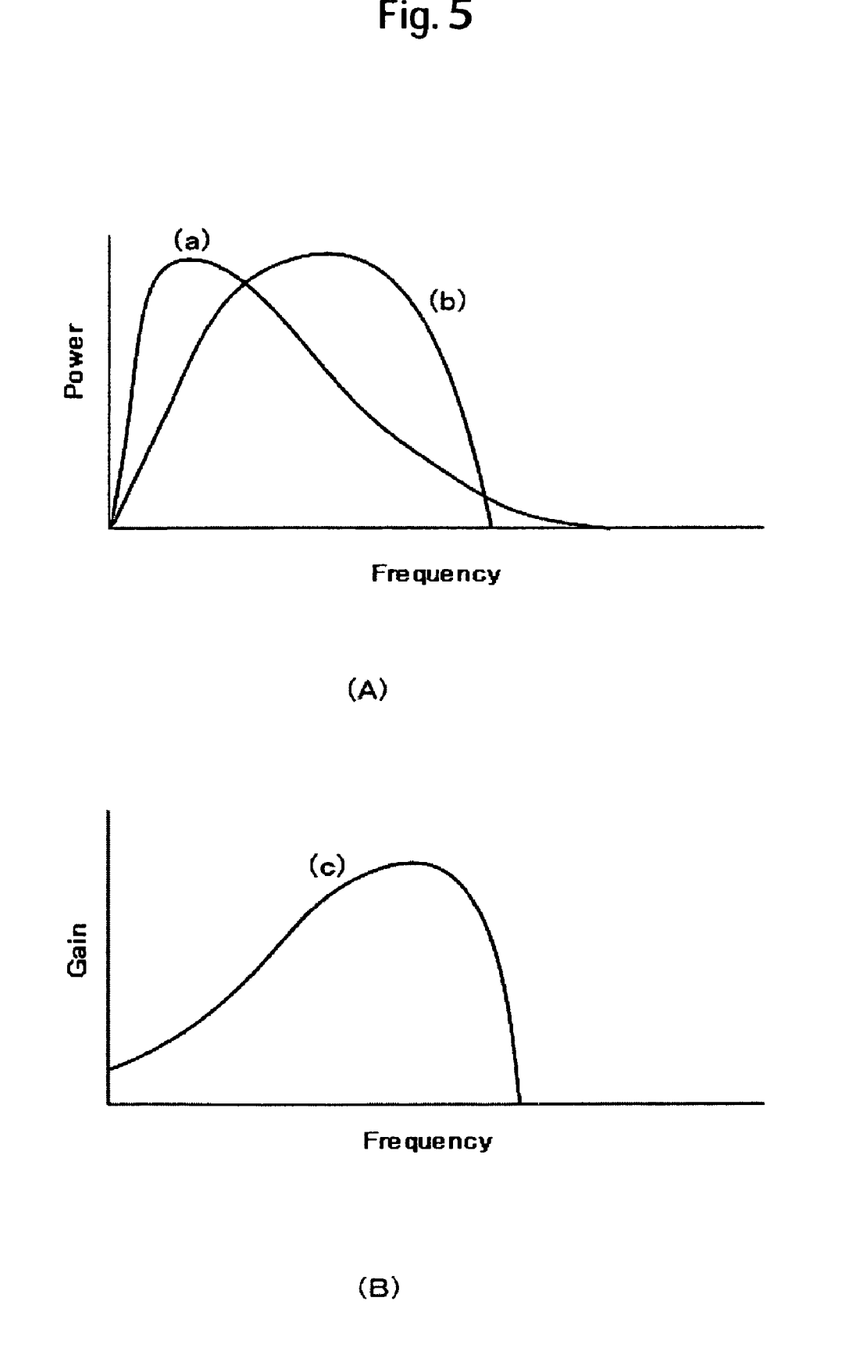
FIG. 5 is a diagram showing ideal gain characteristics of the data-reading system with respect to a PR4 waveform.

The gain levels required for the data-reading system to equalize the waveform of a reading signal to that of PR4 are shown in FIG. 5. Waveform (a) in FIG. 5(A) represents a power spectrum of the reading signal, and waveform (b) represents a power spectrum of PR4. To equalize the waveform of the reading signal to that of PR4, the gain of the data-reading system needs to be great in a high-frequency band, as shown by waveform (c) in FIG. 5(B). At other PR classes, similar waveform equalizing in the data-reading system is also required in order to increase the gain thereof.

In another perspective, if a sufficient gain cannot be obtained from the data-reading system in a high-frequency band, a reading error easily occurs since the power spectrum of the reading signal cannot be equalized to that of the required PR class. The filtering coefficients of the FIR filter 57 are programmably modified according to an actual operating status of the magnetic disk drive so that the power spectrum of the reading signal waveform approaches that of the required PR class during the operation of the disk drive in normal operation mode.

Other constituent elements of the R/W channel are described below referring back to FIG. 3. The Viterbi decoder 61 is a device that implements maximum likelihood (ML) decoding. In this process, the device first stores multiple data strings into a memory or the like without conducting a clock-pulse-based "0, 1" bit judgment from the reading signal, then detects the most probable data string of all stored data strings, and restores the data string to its original form. In the demodulator 63, the reading signal of the data which was recorded with bit strings of its original data converted for reduced error rate is reconverted into the original data. Serial-to-parallel converter 65 converts reading-signal data of a serial bit string pattern into parallel bit strings and sends the parallel bit strings to the HDC 37.

Defect-Processing Procedure

In the manufacture of the magnetic disk drive 10, various operations are performed during the test/adjustment process steps that follow completion of hardware assembly. These operations include servo data recording on each magnetic disk, adjustments on various parameters relating to each magnetic head, the head amplifier, the R/W channel, and other constituent elements of the magnetic disk drive, and final adjustments on a function thereof under a high operating environmental temperature from, for example, 40° C. to 65° C. In another manufacturing method for the magnetic disk drive pertaining to the present embodiment, sector defect processing is conducted as part of the test/adjustment process steps. Defect processing of the sectors on each recording face of the magnetic disks 11, 12 provided in the magnetic disk drive 10 is described hereunder in accordance with the flow-chart shown in FIG. 6.

Figure 6:
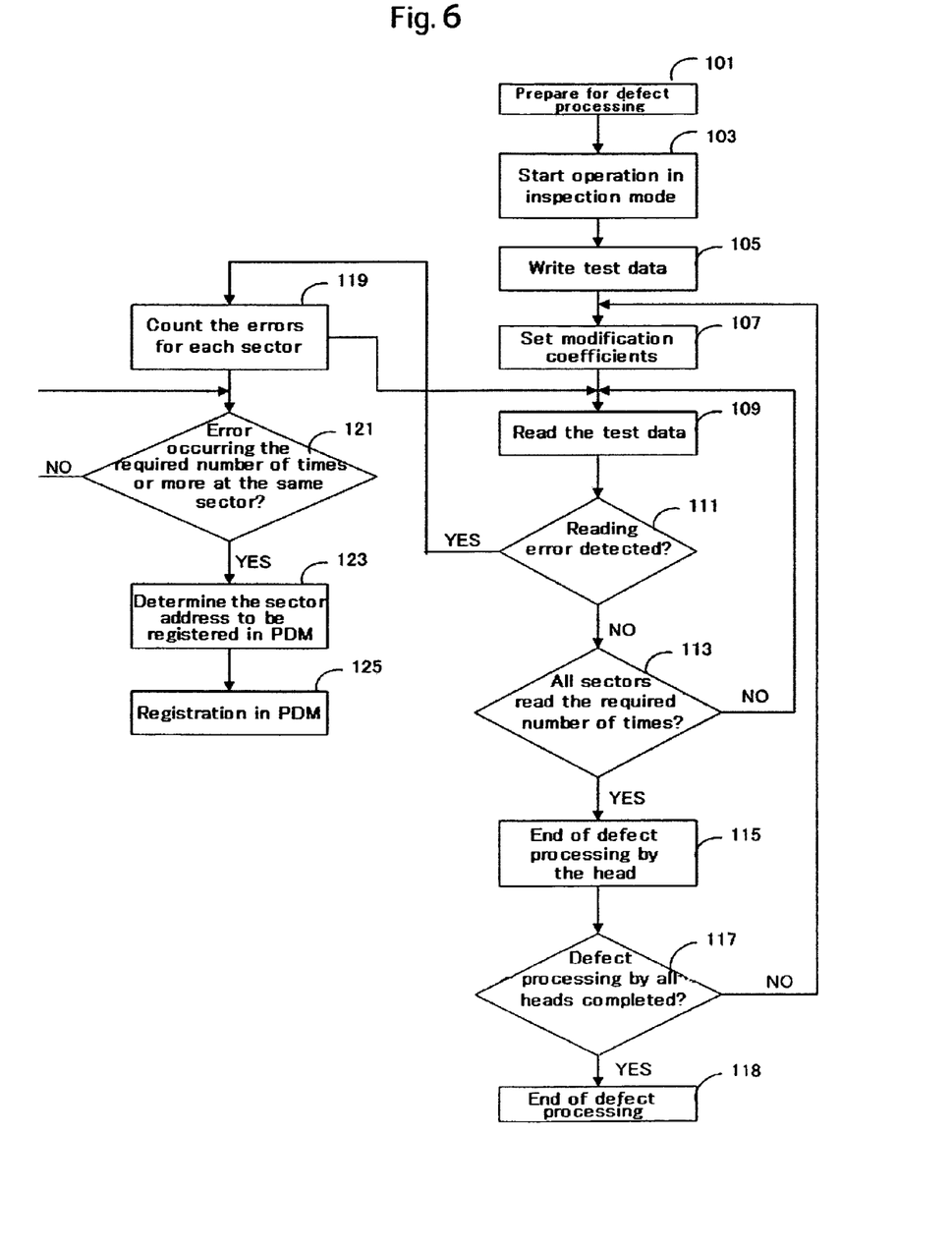
FIG. 6 is a flowchart showing the manufacturing method for a magnetic disk drive that includes defect-processing steps according to another embodiment.

The defect-processing steps employed in the manufacturing method for the magnetic disk drive according to the present embodiment are performed with the magnetic disk drive 10 operated at a relatively high operating environmental temperature of, for example, 40° C.-65° C. The first block 101 is to prepare for defect processing. The filtering coefficient multiplier 71 is constructed so that values of the filtering coefficients h0 to h9 used in the normal operation mode will be set for each magnetic head. Also, a modification table in which modification coefficients for modifying the values of the filtering coefficients h0 to h9 have been arranged for each operating environmental temperature of the magnetic disk drive 10 is stored within the EEPROM of the MPU 31 in such a format as to enable reference by the MPU. The modification coefficients may be stored in the correction table so as to differ according to particular characteristics of the magnetic head, not in the above format.

The modification coefficients are used to modify filtering coefficients so that the gain of the FIR filter is reduced below the optimum value used for the magnetic disk drive 10 to operate in normal operation mode. These modification coefficients are referred to only during the operation of the magnetic disk drive 10 in inspection mode when the defect-processing program is executed. After the reference, the modification coefficients are applied to the filtering coefficient multiplier 71. The number of symbols in ECC is set to be 2 or 4, both smaller than the number of symbols in normal operation mode, in order to reduce a reading-error correction capability of the HDC 37. Thus, even if a small number of bit reversal errors occur during the read/write tests, since the reversal errors are detected as reading errors, defect detection sensitivity is enhanced and the defective sectors that cause reading errors can also be detected even under a high operating environmental temperature. Other parameters related to waveform equalizing of the data-reading system are set to be the optimum values used in the normal operation mode.

In block 103, the magnetic disk drive 10 is operated in the inspection mode. During the defect-processing steps according to the present embodiment, after the magnetic disk drive 10 has started operating in the inspection mode, the MPU 31 reads out the stored defect-processing program from the ROM and executes the program. Instead of being read out in this way, the defect-processing program may be transferred from the host computer through the interface connector 39 to the magnetic disk drive 10. The defect-processing steps according to the present embodiment can also be performed while the operation of the magnetic disk drive 10 is being controlled from a special test apparatus through the interface connector 39. However, if the magnetic disk drive 10 is constructed so that it performs the defect-processing steps itself by executing the defect-processing program, a method suitable for sector defect processing during mass production is therefore created since investments in a test apparatus can be saved.

Before the magnetic disk drive 10 is powered on to operate in the inspection mode, a special jumper block is mounted at jumper terminals of the magnetic disk drive 10. The MPU is constructed so that when power is turned on, the MPU initially refers to a state of the jumper block, and after recognizing that the jumper block is set to the inspection mode, the MPU starts executing the defect-processing program by starting up the firmware associated with the inspection mode. To operate the magnetic disk drive 10 in the inspection mode, the magnetic disk drive may be switched from the normal operation mode to the inspection mode by sending a command from the host computer through the interface connector 39.

In block 105, the magnetic heads 17a to 17d are used to write test data onto all sectors defined on each recording face of the magnetic disks 11, 12. The test data is constructed of bit patterns specially devised to fit defect detection of the sectors. The test data, although written with the defect-processing program in the ROM, may be transferred from the host computer to the magnetic disk drive 10.

In block 107, the MPU 31 makes reference to the temperature value measured by the temperature sensor 33, as an operating environmental temperature, and selects from the EEPROM-stored modification table a modification coefficient value associated with the operating environmental temperature. Next, the MPU sends the modification coefficient value to the filtering coefficient multiplier 71 and then replaces the optimized value of the filtering coefficients h0-h9 in the normal operation mode, with the value modified using the modification coefficient. Since such construction as described above can be easily realized just by program operations, the construction leads to almost no increases in costs of the magnetic disk drive. In addition, although the modification coefficient needs to be determined by collecting considerable volumes of experimental data and using a trial-and-error approach, the modification coefficient is rapidly responsive even in that case.

In lieu of internal temperature measurement of the magnetic disk drive by the temperature sensor 33, an ambient temperature of the magnetic disk drive 10 during defect processing may be measured as an operating environmental temperature. After this, an appropriate instruction may be given from the host computer to the magnetic disk drive 10. The optimum values of the filtering coefficients h0-h9 are set for each of the magnetic heads 17a, 17b, 17c, 7d.

Instead of sending the modification coefficient to the filtering coefficient multiplier 71, the MPU 31 may set in the filtering coefficient multiplier 71 a new filtering coefficient derived by modifying the associated filtering coefficient itself by use of the modification coefficient. Alternatively, the filtering coefficient multiplier 71 may store the optimum value of the filtering coefficients h0-h9 and the modification coefficient that has been received from the MPU 31, and then while computing both values to execute waveform equalization, generate a signal to be sent to the Viterbi decoder 61.

In block 109, the test data that was written onto each sector is read in turn. In block 111, the HDC 37 uses the ECC having the internally set number of symbols and inspects whether the test data can be read without a reading error occurring. Even if the data read above contains a bit reversal error, the HDC 37 can correct the data to a correct bit string and read the data, provided that the reversal error is within an error range correctible using the ECC. In that case, therefore, a reading error does not occur. However, since the number of ECC symbols used in the inspection mode is reduced below the number of symbols used in the normal operation mode, the error correction capability of the HDC 37 is also reduced and a reading error occurs more easily than in the normal operation mode.

If it cannot properly read test data by using ECC, the HDC 37 clearly asserts that a reading error has occurred. In block 119, an absolute address block (ABA) of the sector that has caused the reading error is stored into the RAM, and when control is shifted to block 109, test data of the sectors that further follow is read. In the present embodiment, read/write tests are repeated a plurality of times for one sector and whether the sector is defective is judged from how often a reading error occurs at the particular sector.

When the read/write tests are repeated a plurality of times, the test data initially written onto each sector is read a plurality of times or new data is read after being overwritten onto a sector whose existing data has been read a required number of times. In block 121, whether a reading error has occurred a required number of times or more at one specific sector is confirmed with respect to all sectors at which the reading error occurred. If the reading error has occurred the required number of times or more, control is shifted to block 123 to determine the corresponding sector as one to be registered in a primary defect map (PDM), and then in block 125, ABA of that sector is also registered in PDM. PDM is a table used to skip defective sectors when an independent logical block address (LBA) is sequentially allocated to each sector present on each recording face of the magnetic disks 11, 12. PDM is provided in a region of a magnetic disk not used by the user. Therefore, since LBA is not assigned to the sectors having their ABAs registered in PDM, the user does not use the sectors after shipping of the magnetic disk drive.

If a reading error is not detected in block 111, test data of the sectors that further follow is read, and in block 113, it is judged whether the read/write tests have been repeated the required number of times for all sectors on the same recording face. If the required number of times for a sector has not been reached, control is returned to block 109, in which block, the read/write tests are then repeated up to the required number of times for the sector. In block 115, the read/write tests are repeated the required number of times for all sectors on the recording face, and thus, defect processing for the corresponding magnetic head is completed. In block 117, it is judged whether recording faces whose defect processing is not completed are present. If any such recording faces exist, control is returned to block 107 to apply modification coefficients to the filtering coefficient values set for the magnetic head, and then to proceed with defect processing in block 109 onward. When, in block 117, defect processing for all the four recording faces 11a, 11b, 11c, 11d, is judged to be complete, all defect processing is completed in block 118.

Method of Determining a Modification Coefficient

Figure 7:
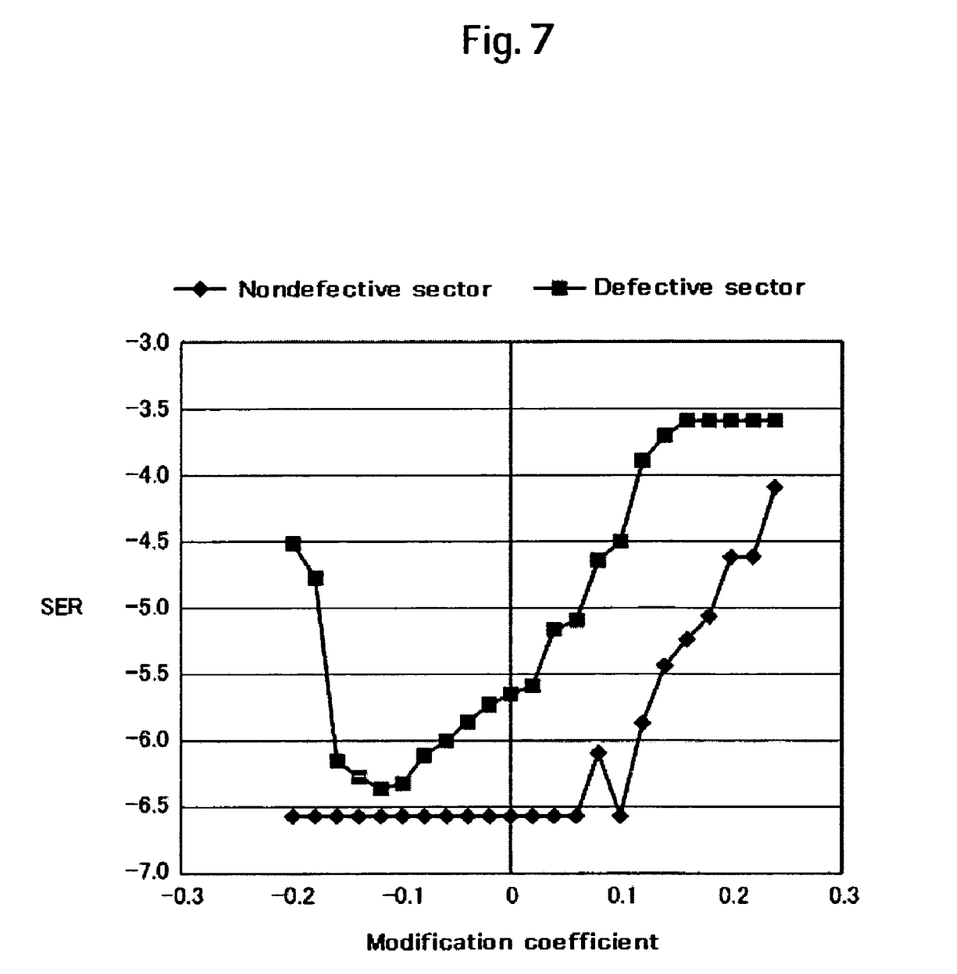
FIG. 7 is a diagram showing a state in which the SER value of defective sectors and that of nondefective sectors change according to modification coefficient value.

FIG. 7 is a graph showing an example of the independent SER measurement results that were obtained from a defective sector group and a nondefective sector group each. The measurements were conducted by, after a reading error occurred during operation of the magnetic disk drive 10 in normal operation mode at an operating environmental temperature close to 0° C., operating the disk drive at an operating environmental temperature of 65° C. and conducting read/write tests while changing each modification coefficient of the FIR filter. The defective sector group refers to each sector that caused a reading error under the above conditions, and the nondefective sector group refers to the sectors that did not cause a reading error. Modification coefficient "0" indicates a state in which the associated filtering coefficient of the FIR filter remains set to an ideal value and is not modified. SER is a parameter measured for each pair consisting of a magnetic head and a recording face of an associated magnetic disk. The parameter is a common logarithm of the value obtained by dividing the number of sectors at which the error was detected as a result of the read/write tests, by the total number of bits which were read. Additionally, since the number of ECC symbols is 2, a reading error, in fact, also occurs at the nondefective sectors where such an error was detected in normal operation mode. The "Defective sector" in the graph indicates the sectors at which the reading error occurred at the low operating environmental temperature close to 0° C.

When the filtering coefficient of the FIR filter in normal operation mode is used intact with "0" assigned as the modification coefficient, SER of defective sectors is about −5.6 and that of nondefective sectors is about −6.6. As the modification coefficient is increased in its plus direction, SER of the nondefective sectors does not increase for modification efficient values up to about 1.1 and only SER of the defective sectors increases. As the modification coefficient is further increased, although both the defective sectors and the nondefective sectors increase in SER, a significant difference in SER appears between both. This indicates two facts. One is that when reducing the gain of the FIR filter by applying a modification coefficient and modifying a filtering coefficient from its optimum value is followed by read/write testing, SER of the sectors at which a reading error occurred at a low operating environmental temperature can also be increased under an operating environmental temperature of 65° C. The other is that even when read/write tests are conducted at the high operating environmental temperature of 65° C., those defective sectors can be detected.

The above, in turn, indicates that the sectors whose defects emerge as reading errors during operation at low operating environmental temperatures can likewise be detected by read/write testing that uses a conventional high-temperature chamber. Detection accuracy on defective sectors can thus be improved without equipment investment in a low-temperature chamber or the like. A modification coefficient based on the SER value adopted for normal read/write tests, e.g., a value of −4.0, may be defined for defective sectors to take such a value of SER. This avoids defect registration of nondefective sectors due to excessive modification of the filtering coefficients, or a decrease in the detection accuracy of the defective sectors emerging at low temperature. Hence, appropriate defect detection becomes possible.

When a filtering coefficient of the FIR filter is modified using a modification coefficient, although a gain in a low-frequency band also decreases, a level of the decrease is small, compared with that of the gain obtained in a high-frequency band. In addition, a decrease in the gain of the data-reading system in a low-frequency band has almost no influence on the detection of defective sectors. For these reasons, no problems arise that are associated with detection accuracy.

A description has heretofore been given of the methods in which the filtering coefficients of the FIR filter are modified for reduced high-frequency band gain of the data-reading system and then the frequency characteristics thereof at low operating environmental temperatures are generated in a simulated form to process defects. The present invention does not limit its scope to adjusting the filtering coefficients of the FIR filter, and the above can likewise be realized by adjusting the LPF 53 and other constituent elements each programmably changeable in cutoff frequency. For LPF, its gain in a high-frequency band can be reduced by lowering the cutoff frequency. In addition, combining two or more of the constituent elements makes defect processing possible in a like manner by adjusting the gain of the data-reading system in a high-frequency band.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A manufacturing method for a magnetic disk drive which includes a magnetic disk on which a plurality of sectors are defined, and a data-reading system employing a partial response method, and which processes defects in the sectors, said manufacturing method comprising:
   writing test data onto the plurality of sectors;
   reducing a gain of the data-reading system in a high-frequency band to a value smaller than a value to be used in a normal operation mode; and
   reading, via the data-reading system, the test data from the sectors onto which the test data was written, and detecting a reading error, the manufacturing method further comprising modifying a decrement in the gain of the high-frequency band according to a particular operating environmental temperature of the magnetic disk drive existing when defects in the sectors are processed.

2. The manufacturing method according to claim 1, further comprising setting the number of error correction code (ECC) symbols to stay within a range of 2 to 4.

3. The manufacturing method according to claim 1,
   wherein the data-reading system includes a low-pass filter; and
   wherein, in reducing said gain, the gain in the high-frequency band is reduced by adjusting a cutoff frequency of the low-pass filter.

4. The manufacturing method according to claim 1, further comprising registering an address of a sector at which the reading error has been detected, in a primary defect map.

5. The manufacturing method according to claim 1, wherein each of said writing, reducing, and reading is performed by an internal microprocessor unit of the magnetic disk drive by executing a defect-processing program.

6. A manufacturing method for a magnetic disk drive which includes a magnetic disk on which a plurality of sectors are defined, and a data-reading system employing a partial response method, and which processes defects in the sectors, said manufacturing method comprising:
   writing test data onto the plurality of sectors;
   reducing a gain of the data-reading system in a high-frequency band to a value smaller than a value to be used in a normal operation mode; and
   reading, via the data-reading system, the test data from the sectors onto which the test data was written, and detecting a reading error, wherein said writing, reducing, and reading are each performed in a 40-65° C. operating environmental temperature range of the magnetic disk drive.

7. The manufacturing method according to claim 6, further comprising setting the number of error correction code (ECC) symbols to stay within a range of 2 to 4.

8. The manufacturing method according to claim 6,
   wherein the data-reading system includes a low-pass filter; and
   wherein, in reducing said gain, the gain in the high-frequency band is reduced by adjusting a cutoff frequency of the low-pass filter.

9. The manufacturing method according to claim 6, further comprising registering an address of a sector at which the reading error has been detected, in a primary defect map.

10. The manufacturing method according to claim 6, wherein each of said writing, reducing, and reading is performed by an internal microprocessor unit of the magnetic disk drive by executing a defect-processing program.

11. A manufacturing method for a magnetic disk drive which includes a magnetic disk on which a plurality of sectors are defined, and a data-reading system employing a partial response method, and which processes defects in the sectors, said manufacturing method comprising:
   writing test data onto the plurality of sectors;
   reducing a gain of the data-reading system in a high-frequency band to a value smaller than a value to be used in a normal operation mode; and
   reading, via the data-reading system, the test data from the sectors onto which the test data was written, and detecting a reading error, wherein the data-reading system includes a finite impulse response (FIR) filter; and
   wherein, in reducing said gain, the gain in the high-frequency band is reduced by adjusting a filtering coefficient of the FIR filter.

12. The manufacturing method according to claim 11, wherein the filtering coefficient is adjusted by modifying, by use of a required modification coefficient, a filtering coefficient to be used in the normal operation mode.

13. The manufacturing method according to claim 11, further comprising setting the number of error correction code (ECC) symbols to stay within a range of 2 to 4.

14. The manufacturing method according to claim 11,
   wherein the data-reading system includes a low-pass filter; and
   wherein, in reducing said gain, the gain in the high-frequency band is reduced by adjusting a cutoff frequency of the low-pass filter.

15. The manufacturing method according to claim 11, further comprising registering an address of a sector at which the reading error has been detected, in a primary defect map.

16. The manufacturing method according to claim 11, wherein each of said writing, reducing, and reading is performed by an internal microprocessor unit of the magnetic disk drive by executing a defect-processing program.

* * * * *